United States Patent
Belinchón Vergara et al.

(10) Patent No.: US 8,510,457 B2
(45) Date of Patent: Aug. 13, 2013

(54) STORAGE OF NETWORK DATA

(75) Inventors: Maria-Carmen Belinchón Vergara, Getafe (ES); Hubert Przybysz, Hägersten (SE); Juan Manuel Fernandez Galmes, Getafe (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 452 days.

(21) Appl. No.: 12/745,655

(22) PCT Filed: Nov. 30, 2007

(86) PCT No.: PCT/EP2007/063095
§ 371 (c)(1),
(2), (4) Date: Jul. 1, 2010

(87) PCT Pub. No.: WO2009/068113
PCT Pub. Date: Jun. 4, 2009

(65) Prior Publication Data
US 2010/0306397 A1    Dec. 2, 2010

(51) Int. Cl.
*G06F 15/16* (2006.01)
(52) U.S. Cl.
USPC ........... 709/230; 709/203; 709/221; 709/225; 370/352; 370/401; 370/328
(58) Field of Classification Search
USPC ................. 709/203, 230, 221, 225; 455/411, 455/414.1; 370/352, 401, 328, 310
See application file for complete search history.

(56) References Cited

U.S. PATENT DOCUMENTS

| | | | |
|---|---|---|---|
| 2005/0278420 A1* | 12/2005 | Hartikainen et al. | 709/203 |
| 2006/0077965 A1* | 4/2006 | Garcia-Martin et al. | 370/352 |
| 2006/0178132 A1* | 8/2006 | Tammi et al. | 455/411 |
| 2006/0268904 A1* | 11/2006 | Bae et al. | 370/401 |
| 2009/0210743 A1* | 8/2009 | Gu et al. | 714/15 |
| 2010/0039930 A1* | 2/2010 | Liang et al. | 370/216 |

FOREIGN PATENT DOCUMENTS

EP    1916821 A1 *   4/2008

OTHER PUBLICATIONS

3GPP: "Study on IMS Restoration Procedures" 3G99 TR 23.820 v4.0, http://www.3gpp.org/ftp/tsg_ct/WG4_protocollars_ex_CN4/TSGCT4_37_Sophia_Antipolis_2007_11/Docs/C4-072052.zip/23820-040.doc [retrieved Oct. 13, 2008] XP002499467.

* cited by examiner

*Primary Examiner* — Wing F Chan
*Assistant Examiner* — Benjamin M Thieu
(74) *Attorney, Agent, or Firm* — Roger S. Burleigh

(57) ABSTRACT

A generic method is described for storing data in the HSS (2) by the S-CSCF (1) of an IMS. When a SIP message containing new information relating to an IMPI/IMPU pair is received by the S-CSCF (1), a data package is created for storage at the HSS (2), containing the new information. An SAR command is sent to the HSS (2) containing an AVP including an instruction to the HSS (2) and the new data package. In one aspect a unique data package is controlled by the S-CSCF (1). When new information relating to the IMPI/IMPU is received in a SIP message, this is added to any previously sent data package to create a new data package. In another aspect the HSS (2) controls a unique data package, returning the data package to the S-CSCF (1) to be amended if necessary. In another aspect separate data packages are used.

25 Claims, 14 Drawing Sheets

STORAGE OF NETWORK DATA

TECHNICAL FIELD

The present invention relates to the storage of network data in a communications network, for example a Universal Mobile Telecommunications System having an IP Multimedia System. In particular, the invention relates to the storage of network data in a Home Subscriber Server in an IP Multimedia Subsystem.

BACKGROUND

IP Multimedia services provide a dynamic combination of voice, video, messaging, data, etc. within the same session. By growing the number of basic applications and the media that it is possible to combine, the number of services offered to the end users will grow, and the inter-personal communication experience will be enriched. This will lead to a new generation of personalised, rich multimedia communication services, including so-called "combinational IP Multimedia" services.

The Universal Mobile Telecommunications System (UMTS) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). The IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both Public Switched Telephone Network/Integrated Services Digital Network (PSTN/ISDN) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.228 V5.8.0 (2004-03).

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded. In the case that an IFC indicates that a SIP message received at the S-CSCF should be forwarded to a particular SIP AS, that AS is added into the message path. Once the SIP message is returned by the AS to the S-CSCF, it is forwarded on towards its final destination, or forwarded to another AS if this is indicated in the IFCs.

The 3GPP uses the concept of contact addresses in the IMS network. These addresses are tied to an IP Multimedia Private Identity (IMPI) and IP Multimedia Public Identity (IMPU)

and are typically IP addresses of user terminals. A particular IMPU may be simultaneously registered from multiple UEs that use different IMPIs and different contact addresses. It will eventually be possible to register a Public User Identity that is simultaneously shared across multiple contact addresses (at the same or via separate UEs) via IMS registration procedures.

Certain entities of an IMS are critical entities expected to be fault tolerant since a failure in such entities may cause an important network failure and a huge amount of subscribers of such network not being able to communicate. In particular, a S-CSCF serving a number of IMS subscribers is one of these entities whose failure might make the IMS reach abnormal processing conditions so that the number of IMS subscribers served in the S-CSCF cannot properly make use of services or cannot even make calls. In this respect most, or all, failures are accompanied by a reset of the failing entity and a restart once the failure has been solved, probably by reloading permanent stable data if inconsistent data were found to be a reason for the failure. Other issues may also necessitate a critical entity going out of service, for example a software or hardware update which cannot enter into operation without producing a restart of the critical entity concerned.

A mechanism to recover the network after an IMS restoration has been discussed in the 3GPP work item CP-070031.0 and the resulting study 3GPP TS 23.820 v0.2.0 and v0.3.0. This study contains a proposal that the S-CSCF should store some network information into the HSS for later retrieval after a S-CSCF failure. In this proposal, the nature of this data is the user's registered contact headers including Display-Name, SIP URI and all contact header parameters, together with the path header and timestamp associated at registration.

However, there may be other types of information that the S-CSCF may need to store in the HSS in order to recover fully from failure. One example of such information is subscriptions to the registration event package handled by the S-CSCF. It is important that this information can be recovered by the S-CSCF, since it contains details of the entities like the UEs, P-CSCFs and ASs that have subscribed to the event. If this information is lost, these subscribing entities will remain unaware if the user is otherwise deregistered. This in turn may lead to an attempt by a subscribing entity to initiate traffic as though the user was registered, leading to a fault in the network.

Thus existing proposals for S-CSCF data to be stored in HSS do not cover all the data that the S-CSCF may need to store in the HSS to be able to fully recover and align state information across the IMS. The existing proposals are general in nature and do not detail the method by which the S-CSCF data is stored in the HSS.

One proposal involves the use of the Cx Server Assignment Request (SAR) command during the registration process to store the contact data information in the HSS. However, this mechanism is not readily applicable when multiple contact addresses are used, since the deregistration of one contact address may leave other contact addresses still to be registered, and will therefore not result in any change of the user registration status.

Furthermore, some indication must be made of how contact addresses are stored in the HSS, since a normal SAR command leads to the overwriting of previous contact information in a re-registration case.

There is thus a need for a suitable mechanism by which S-CSCF information (such as contact addresses and registration event package information) can be stored in the HSS and deleted when required.

SUMMARY

The invention introduces a generic mechanism in the Cx interface for storage and retrieval of data in the HSS by the S-CSCF.

In accordance with one aspect of the present invention there is provided a method for use by an S-CSCF of an IMS. The method comprises receiving a SIP message containing information relating to an IMPI/IMPU pair and identifying the type of information contained in the SIP message. The S-CSCF also identifies whether or not a previous data package relating to the IMPI/IMPU pair has previously been sent to the HSS for storage, and creates a new data package, containing the information, to be sent to and stored by a Home Subscriber Server "HSS". An SAR command is sent to the HSS containing a Server-Assignment-type AVP which includes an instruction to the HSS and the new data package.

In one embodiment, no previous data package for the IMPI/IMPU pair has been sent to the HSS for storage and the SIP message is a registration request. In this case the AVP in the SAR command contains the instruction "REGISTRATION".

If a previous data package for the IMPI/IMPU pair has been sent to the HSS for storage, then the new data package combines the information relating to the IMPI/IMPU pair received in the SIP message with the information contained in the previous data package. This "combination" of information may involve adding data to the previous data package to create the new data package, or deleting data from the previous data package to create the new package. If the previously stored package is to be deleted in its entirety, the new data package is empty, and the AVP in the SAR command contains the instruction "DE-REGISTRATION" and the empty data package so as to instruct the HSS to delete the previous data package.

If the SIP message is a registration request for an additional address to be associated with for the IMPI/IMPU pair, then the AVP in the SAR command contains the instruction "RE-REGISTRATION". If the SIP message is not associated with registration or de-registration, then the AVP in the SAR command contains the instruction "STORE". Thus information can be stored at the HSS even if it is not triggered by a registration or de-registration process. Examples include a subscription request to the registration event package for the IMPI/IMPU pair, or a cancellation of such a subscription.

If the SIP message is a deregistration request, then the AVP in the SAR command contains the instruction "DE-REGISTRATION".

In accordance with another aspect of the present invention there is provided a method for use in an IMS. The method comprises the receipt, at an S-CSCF, of a SIP message containing information relating to an IMPI/IMPU pair. The S-CSCF identifies the type of information contained in the SIP message, and creates a new data package, containing the information, to be sent to and stored by an HSS. A first SAR command is sent from the S-CSCF to the HSS. The first SAR command contains a Server-Assignment-type AVP including an instruction to the HSS and the new data package. The HSS identifies whether or not a previous data package relating to the IMPI/IMPU pair is currently stored.

If a previous data package relating to the IMPI/IMPU pair is not currently stored at the HSS, the new data package is stored at the HSS. In one embodiment, the SIP message is a registration request, in which case the AVP in the first SAR command contains the instruction "REGISTRATION".

If a previous data package associated with the IMPI/IMPU pair is currently stored at the HSS, then an error message is returned from the HSS to the S-CSCF, the error message including the previously stored data package. The C-CSCF creates a further data package which combines the information relating to the IMPI/IMPU pair received in the SIP message with the information contained in the previous data package. A second SAR command containing an AVP including the instruction "STORE" and the further data package is sent from the S-CSCF to the HSS and stored at the HSS. Again, the "combination" of information in the further data package may involve adding data to the previous data package to create the further data package, or deleting data from the previous data package to create the further data package. If the previously stored package is to be deleted in its entirety, the further data package is empty, and the AVP in the SAR command contains the instruction "STORE" and the empty further data package so as to instruct the HSS to delete the previous data package.

If the SIP message is a registration request for an additional address to be associated with for the IMPI/IMPU pair, then the AVP in the first SAR command contains the instruction "RE-REGISTRATION". If the SIP message is not associated with registration, then the AVP in the first SAR command still contains the instruction "RE-REGISTRATION". Examples include a subscription request to the registration event package for the IMPI/IMPU pair, or a cancellation of such subscription. If the SIP message is a deregistration request, then the AVP in the first SAR command contains the instruction "DE-REGISTRATION".

It may be that the S-CSCF knows that the HSS already has stored a previous data package, and chooses to over-write it. In this case, the AVP in the first SAR command includes the instruction "STORE", and the new data package is stored by the HSS whether or not a previous data package related to the IMPI/IMPU pair is currently stored at the HSS. Similarly, if the AVP in the first SAR command includes the instruction "STORE" and the new data package is empty, then the previous data package is deleted at the HSS.

In accordance with a further aspect of the present invention there is provided a method for use by an S-CSCF of an IMS. The method comprises receiving a SIP message containing information relating to an IMPI/IMPU pair, and identifying the type of information contained in the SIP message. A data package, to be sent to and stored by an HSS, is created. The data package includes the information contained in the SIP message and a data label indicating the type of data. A SAR command is sent to the HSS, the SAR command containing a Server-Assignment-type AVP which includes an instruction to the HSS and the data package.

If the SIP message is a registration request and no previous data package for the IMPI/IMPU pair has been sent to the HSS for storage, then the data label indicates that the data package contains contact address information, and the AVP in the SAR command contains the instruction "REGISTRATION". If the SIP message is a registration request for an additional address to be associated with for the IMPI/IMPU pair, then the data label again indicates that the data package contains contact address information, but the AVP in the SAR command contains the instruction "RE-REGISTRATION".

If the SIP message is not associated with registration, then the AVP in the SAR command contains the instruction "RE-REGISTRATION". An example includes a subscription request to a registration event package for the IMPI/IMPU pair, in which case the data label includes an indication that the data package contains information relating to the registration event package.

If a previously stored data package should be deleted from the HSS, then the AVP in the SAR command contains the instruction "DE-REGISTRATION", and the data package contains only the data label and an empty data field, to indicate to the HSS that a previously stored data package identified by the same data label should be deleted. If the SIP message is a deregistration request, then the data label indicates that the data package contains contact address information.

The invention also provides a S-CSCF and/or HSS configured to put the methods described above into operation.

DETAILED DESCRIPTION

Three mechanisms are described which enable the storage of S-CSCF information such as contact addresses and registration event package information into the HSS. For the purposes of the following discussion, it is not important whether or not the HSS understands the data. Furthermore, the data may be in any suitable format. For the purposes of this discussion, data can be considered to be packaged in one or more "blobs" or data packages. The three mechanisms provide different approaches to handling these packages, and are as follows:
1. Unique data package controlled by the S-CSCF.
2. Unique data package controlled by the HSS.
3. Separate data packages.
1. Unique Data Package Controlled by the S-CSCF.

The first approach provides a mechanism in which all the S-CSCF information is stored in the HSS as a unique data package tied to a private public identity IMPI/IMPU pair. The HSS provides the data package of information to the S-CSCF in a Cx message during the registration/deregistration procedures/The S-CSCF knows what data needs to be added to, or removed from, the data package. The S-CSCF therefore performs a unique writing operation into the HSS to store the information.

When the S-CSCF has information to store, the data is packaged and sent to the HSS as part of the S-CSCF information in a Cx-SAR command. If this is part of a registration or de-registration procedure, the SAR command issued by the S-CSCF will contain the Server-Assignment-type Attribute-Value Pair (AVP) set to the value already specified by the 3GPP (i.e. "REGISTRATION", RE-REGISTRATION", "DE-REGISTRATION" . . . ). However, the Cx-SAR command need not be triggered by a registration process, in which case the AVP contains the value "STORE". Whenever the HSS receives a S-CSCF info AVP in a SAR command, the data package is stored for the IMPI/IMPU pair received in the SAR command.

Figure 1:
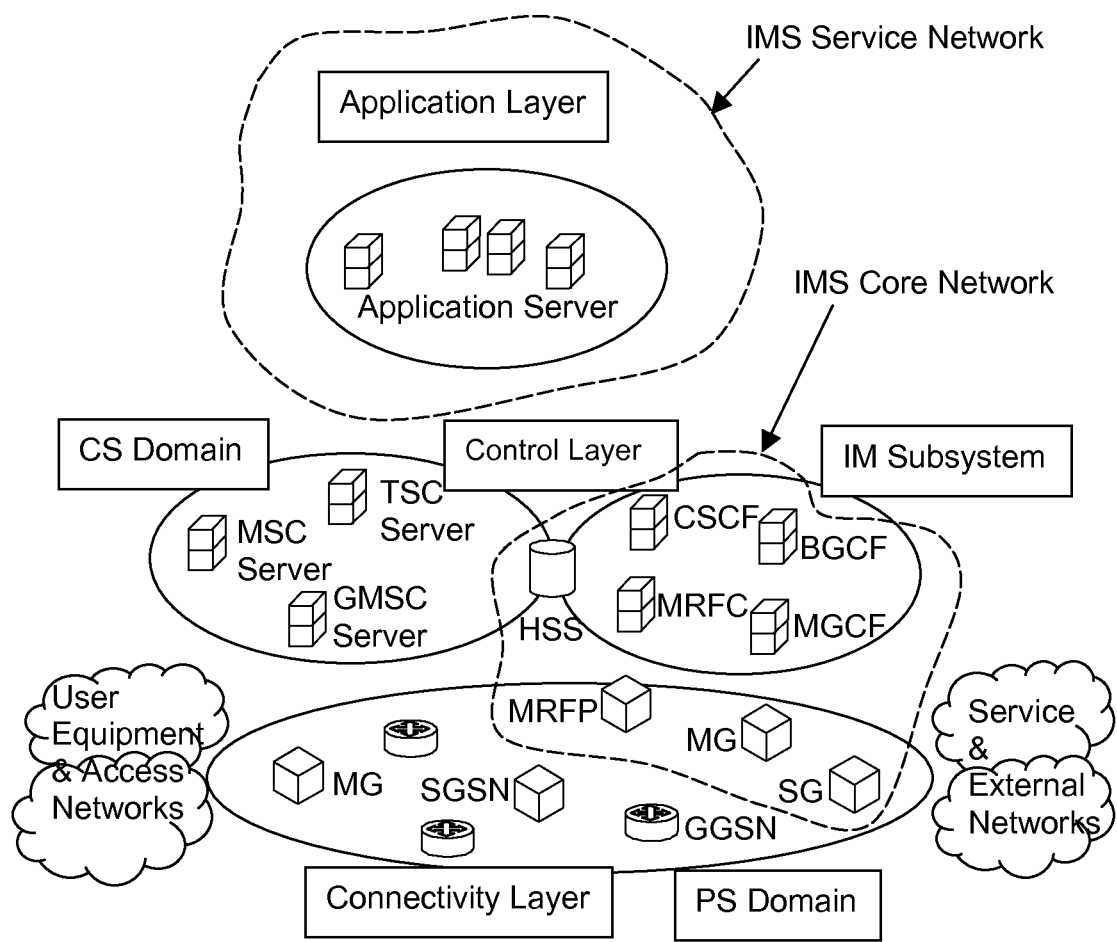
FIG. 1 illustrates schematically the integration of an IP Multimedia Subsystem into a 3G mobile communications system.
Figure 2:
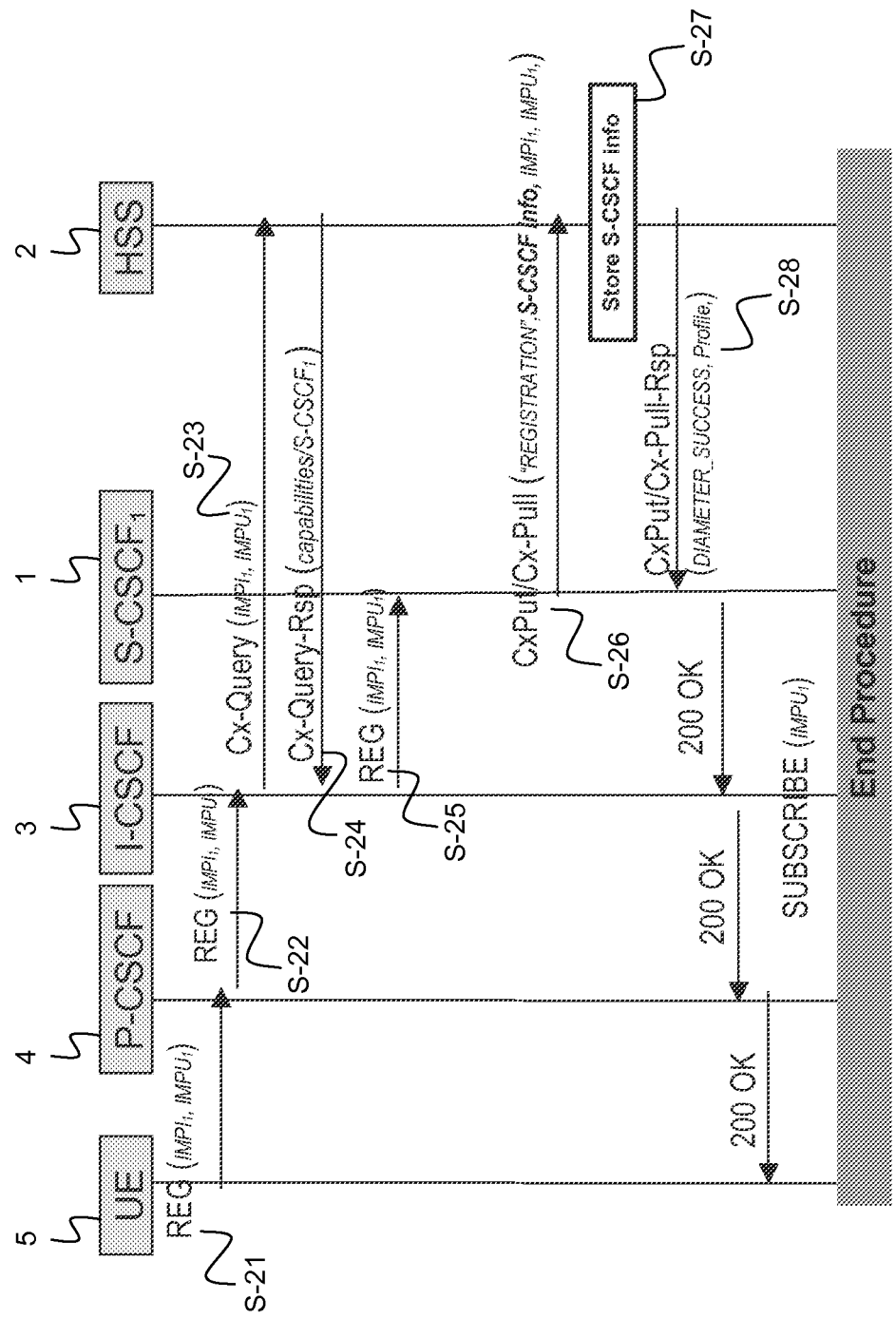
FIG. 2 is a sequence diagram illustrating a sequence of actions carried out during the registration of a subscriber in the IMS when a unique data package is controlled by the S-CSCF.
Figure 3:
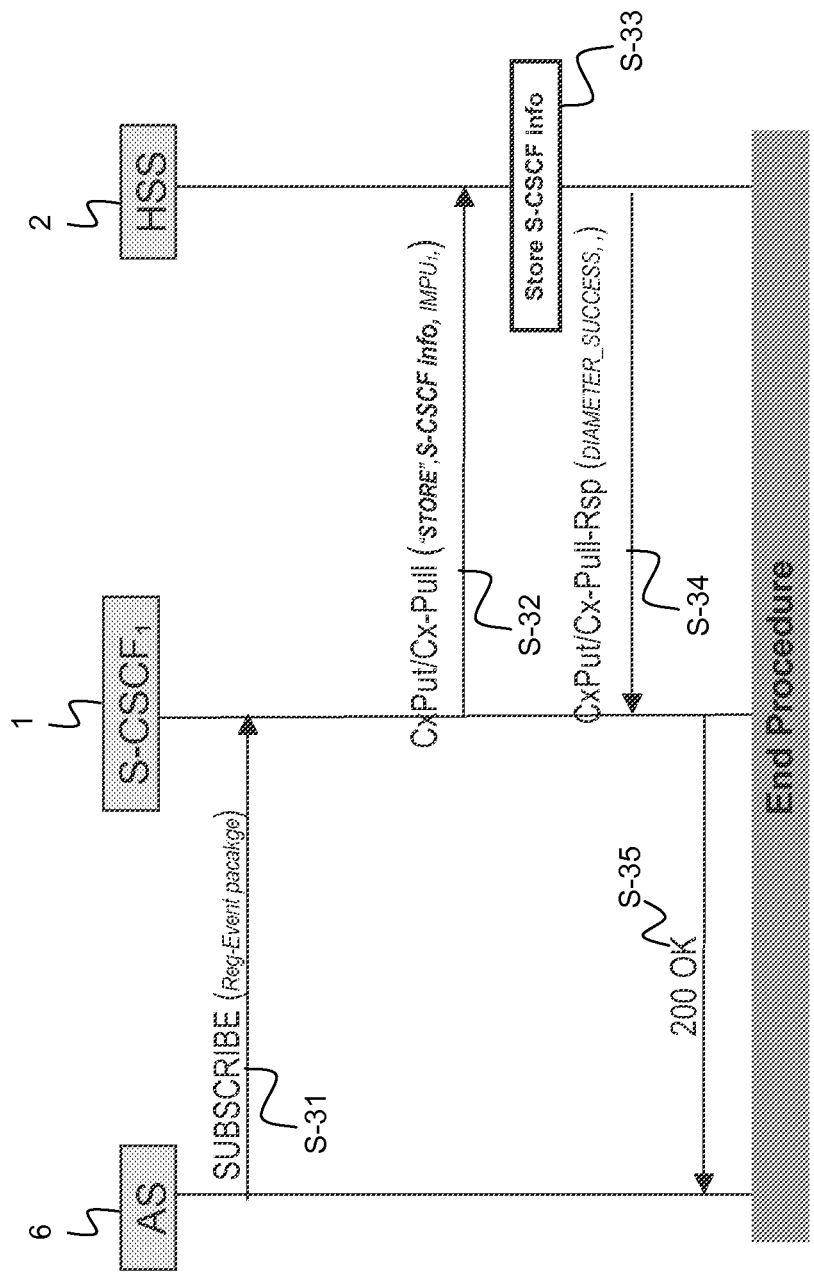
FIG. 3 is a sequence diagram illustrating a sequence of events resulting in data storage at the HSS, not triggered by a registration process.

This may be understood with reference to FIGS. 2 and 3. FIG. 2 illustrates a sequence of actions carried out during the registration of a subscriber 5 in the IMS. For the sake of simplicity, references are made to the given subscriber throughout this specification rather than distinguishing between the given subscriber and a user equipment in use by the given subscriber, assuming that no misinterpretation may turn up for those skilled in the art in view of the reading of applicable 3GPP Technical Specifications.

Suppose the subscriber 5 wishes to register the address "Contact$_1$" for the private/public identity pair IMPI$_1$/IMPU$_1$. In this example an assumption is made there is no other contact for the pair and no registration event package information stored for the pair. The registration of the given subscriber starts with the submission of a register message in a step S-21 from the given subscriber 5 towards a P-CSCF 4 of the IMS, through an access network not depicted for the sake of simplicity. The register message is forwarded in a step S-22 from the P-CSCF 4 towards an I-CSCF 3 in charge of selecting a S-CSCF suitable for serving the given subscriber. Contact$_1$ travels as part of the SIP Contacts header. The I-CSCF 3 does not store individual subscriber data and interrogates, during a step S-23, a HSS 2 holding subscriber data for subscribers of the IMS.

The HSS 2 answers this interrogation in a step S-24 with capabilities required by a selectable S-CSCF 1 for serving the given subscriber. The assumption is that the registration procedure illustrated in FIG. 2 is a first registration and no S-CSCF has previously been assigned.

With the capabilities received during step S-24, the I-CSCF 3 selects a S-CSCF 1 (labelled in FIG. 2 as S-CSCF$_1$) for serving the given subscriber, and forwards the register message towards the selected S-CSCF$_1$ 1 during a step S-25. The S-CSCF$_1$ 1 packages the received information as "S-CSCF-info". In this example this corresponds to the Contact header (Contact$_1$, . . . ). The S-CSCF 1 then sends this data package towards the HSS 2 during a step S-26 with a Cx-SAR command containing the AVP "REGISTRATION". The data package is received at the HSS 2, and stored at the HSS 2 in step S-27. In order to confirm back to the S-CSCF$_1$ 1 its assignation at the HSS for serving the given subscriber, the HSS 2 may upload to the S-CSCF$_1$ 1 during a step S-28 a service profile for the given subscriber, namely a subscriber profile with all the subscriber data necessary for serving the given subscriber.

FIG. 3 illustrates a sequence of events in which data storage at the HSS 2 is not triggered by a registration process. In this example, suppose an AS 6 wishes to subscribe to the registration event package for the public identity IMPU$_1$. The AS 6 sends a subscribe message to the S-CSCF$_1$ 1 in a step S-31. The S-CSCF$_1$ 1 knows that this information must be stored in the HSS, and knows there is no previous information for the IMPU$_1$. The S-CSCF$_1$ 1 packages the received information as "S-CSCF info". In this example this corresponds to the registration event package.

In step S-32 the S-CSCF$_1$ 1 sends the data package to the HSS 2 with a Cx-SAR command containing the AVP "STORE", since this process is not connected to a registration procedure. The HSS 2 saves the data package in step S-33, and responds to the S-SCSF$_1$ 1 in step S-34 to confirm that the storage has been successful. The S-CSCF$_1$ 1 returns a 200-OK message in step S-35 to the AS 6 to confirm the successful subscription to the registration event package.

FIGS. 2 and 3 describe suitable mechanisms for the creation of a data package to be saved at an HSS. In some circumstances it may be necessary to modify a data package already stored at the HSS. This process may be understood as the S-CSCF sending data to the HSS for an IMPI/IMPU pair that has data already stored. This may imply adding data to an existing data package (i.e. storing new data in addition to the data already stored). Alternatively, it may imply deleting data from an existing data package.

Figure 4:
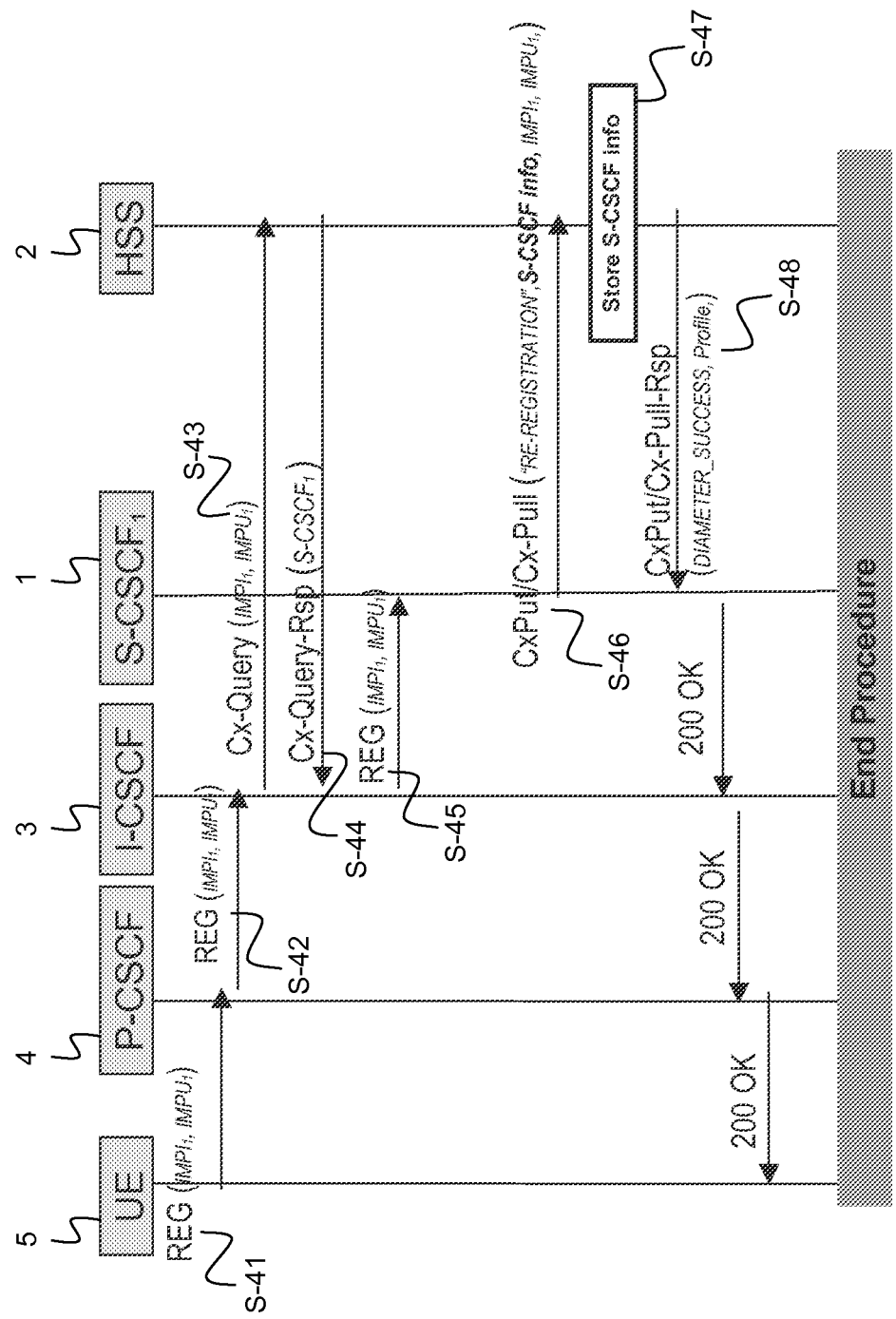
FIG. 4 is a sequence diagram illustrating how data may be added to a data package.

FIG. 4 illustrates a sequence of actions carried out in a situation requiring the addition of data to a data package. In this example, suppose that the subscriber 5 wishes to register the address "Contact$_2$" for the private/public identity pair IMPI$_1$/IMPU$_1$. For the purposes of this example, we assume that Contact$_1$ is already registered for the pair, together with the registration event package information.

The first three steps S-41 to S-43 are similar to steps S-21 to S-23 shown in FIG. 2: the subscriber 5 submits a register message in a step S-41 towards the P-CSCF 4 of the IMS, and this register message is forwarded in step S-42 towards the I-CSCF 3. Contact$_2$ travels as part of the SIP Contacts header. The I-CSCF 3 interrogates the HSS 2 in step S-43.

In step S-44, the HSS 2 answers this interrogation with an identifier of the S-CSCF$_1$ 1 previously assigned for serving the subscriber 5. The I-CSCF 3 then forwards the register message towards the assigned S-CSCF$_1$ 1 during step S-45. The S-CSCF$_1$ 1 recognises that there has been a modification of the information to be stored in the HSS 2. The S-CSCF$_1$ packages the additional information (Contact$_2$ . . . ) together with the information previously stored (Contact$_1$ . . . ) as a single package, again labelled "S-CSCF-info". In step S-46 the S-CSCF 1 sends this data package towards the HSS 2 with a Cx-SAR command containing the AVP "RE-REGISTRATION". The data package is received at the HSS 2, and stored at the HSS 2 in step S-47. In step S-48, the HSS 2 returns to the S-CSCF$_1$ 1 a service profile for the given subscriber, namely a subscriber profile with all the subscriber data necessary for serving the given subscriber.

It will therefore be appreciated that the addition of new data to a data package stored at the HSS 2 essentially involves sending a new data package, containing the old data together with the new data, to replace the data package previously stored.

Figure 5:
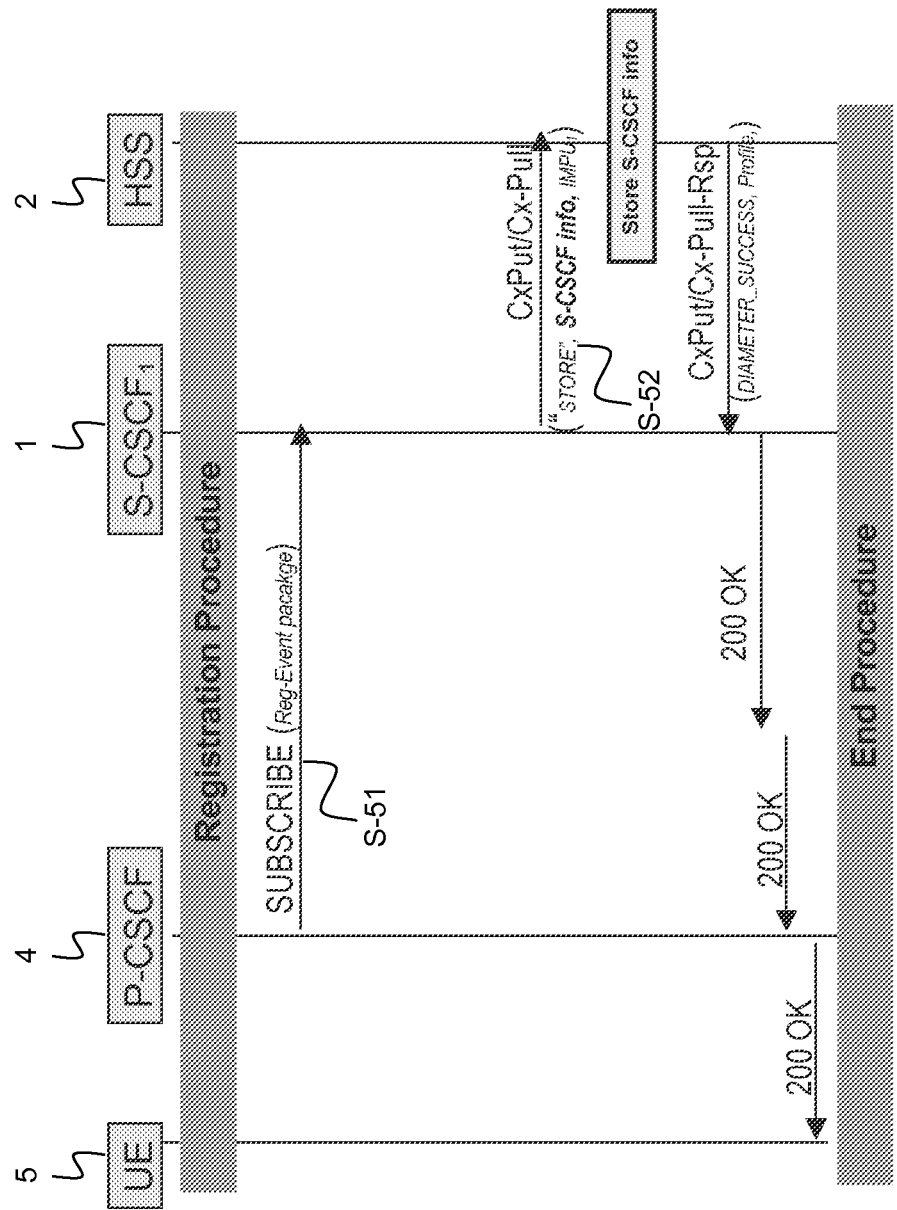
FIG. 5 is a sequence diagram illustrating the modification of a data package which is not triggered by a registration process.

As with the initial creation of a data package, modification of a data package need not be triggered by a registration procedure. FIG. 5 illustrates a sequence of actions in which the P-CSCF 4 wishes to subscribe to the registration event package after registration. In this example, it can be assumed that the contact addresses have already been stored as a data package in the HSS 2 during the registration process as registration event package information.

In step S-51, the UE 5 sends a subscribe message to the S-CSCF$_1$ 1, in order to subscribe to the registration event package information. The S-CSCF$_1$ 1 adds the information that the subscription request has been made to the other data already stored in the data package. The new, enlarged data package is sent to the HSS 2 using the a Cx-SAR command containing the AVP "STORE".

Deletion of parts of the data package may be carried out in the same way as storage. The S-CSCF removes the part of the data package to be deleted and keeps the rest, storing the new data package (without the unwanted data) into the HSS. The same principle can be applied to deletion of the complete data package in the HSS. The S-CSCF deletes a complete data package instead of part of the data package, and sends an empty S-CSCF info AVP to the HSS in a SAR command.

Figure 6:
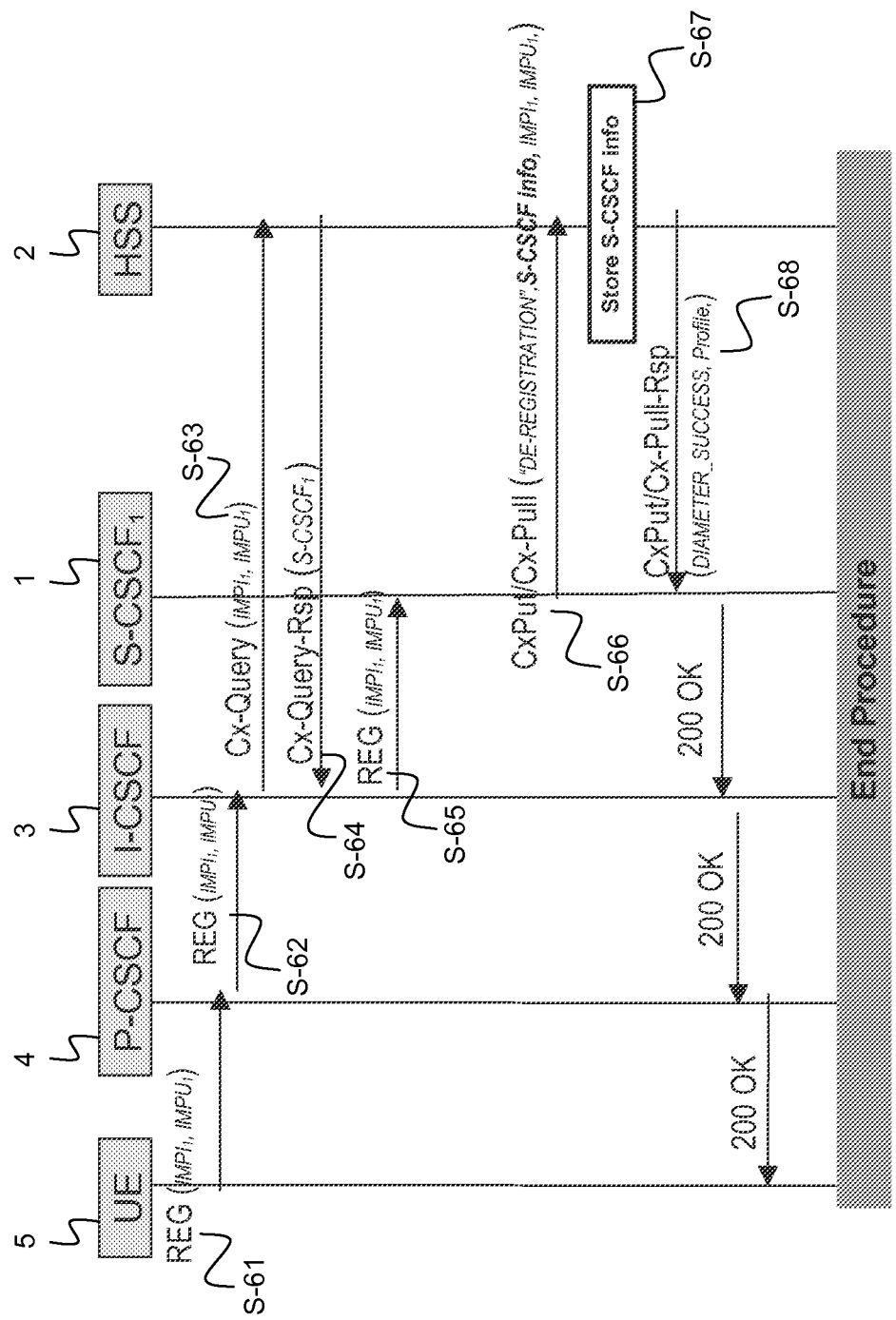
FIG. 6 is a sequence diagram illustrating the sequence of actions involved in deregistering an address.

FIG. 6 illustrates a sequence of actions involved if the subscriber wishes to de-register Contact$_2$ for the private/public pair IMPI$_1$/IMPU$_1$. The process is similar to the process described with reference to FIG. 4: the subscriber 5 submits a register message in step S-61 towards the P-CSCF 4 of the IMS, and this register message is forwarded in step S-62 towards the I-CSCF 3. Contact$_2$ travels as part of the SIP Contacts header. The I-CSCF 3 interrogates the HSS 2 in step S-63, and the HSS 2 answers this interrogation with an identifier of the S-CSCF$_1$ 1 in step S-64. The I-CSCF 3 then forwards the register message towards the assigned S-CSCF$_1$ 1 during step S-65.

The S-CSCF$_1$ 1 recognises that there has been a modification of the information to be stored in the HSS 2, and generates a new data package without Contact$_2$, but with all the other information previously held. The new package is again labelled "S-CSCF-info" and, in step S-66, is sent towards the HSS 2 with a Cx-SAR command containing the AVP "DE-REGISTRATION". The data package is received at the HSS 2, and stored at the HSS 2 in step S-67, replacing the previously stored data package. In step S-68, the HSS 2 returns to the S-CSCF$_1$ 1 a service profile for the given subscriber, namely a subscriber profile with all the subscriber data necessary for serving the given subscriber.

Figure 7:
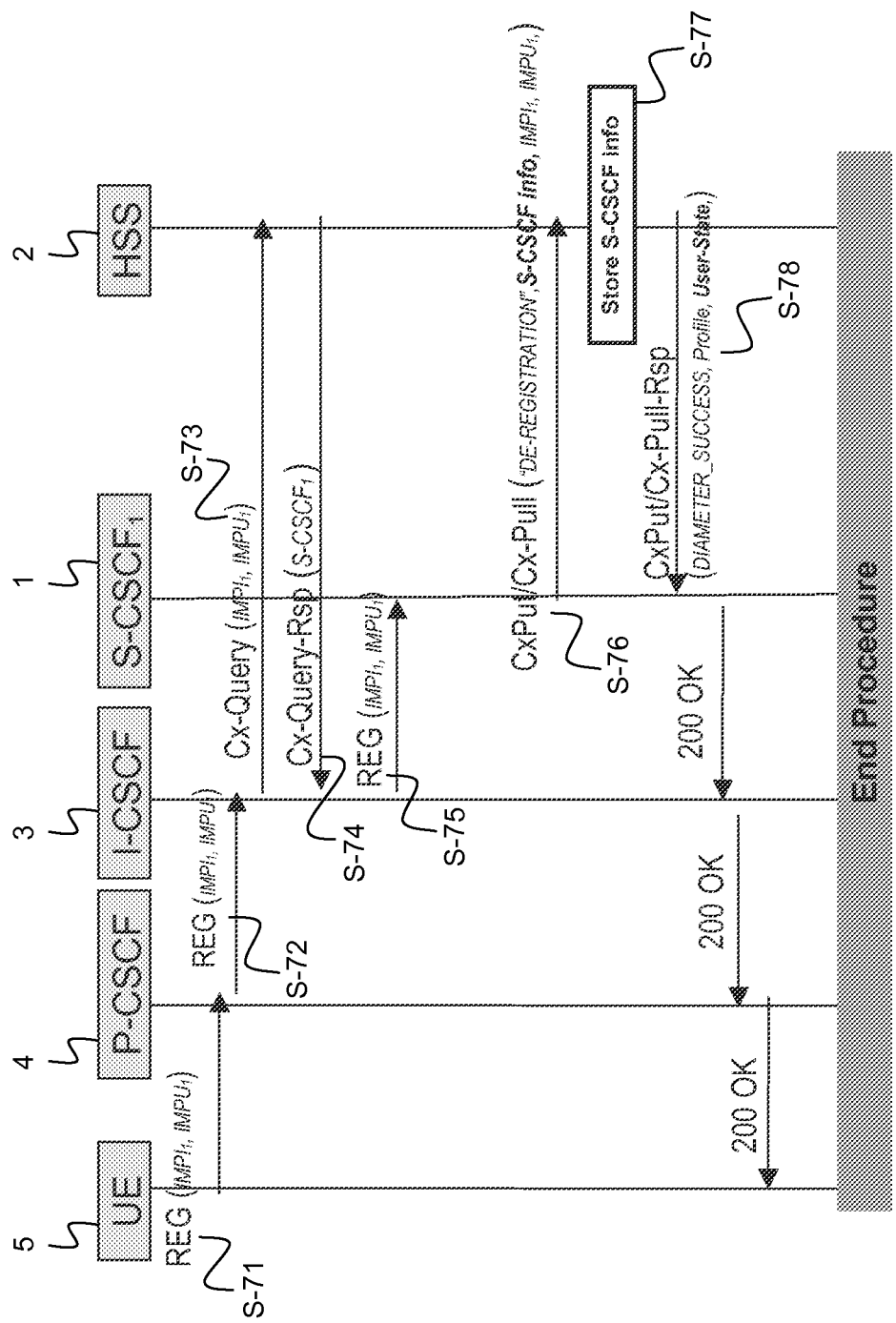
FIG. 7 is a sequence diagram illustrating how a complete data package may be deleted.

FIG. 7 illustrates a sequence of actions involved in deleting a complete data package. Suppose the subscriber 5 wishes to deregister Contact$_1$ for the IMPI$_1$/IMPU$_1$ pair, and that there is no other remaining information for this IMPI$_1$/IMPU$_1$ pair. The process is similar to the process described with reference to FIG. 6: the subscriber 5 submits a register message in step S-71 towards the P-CSCF 4 of the IMS, and this register message is forwarded in step S-72 towards the I-CSCF 3. Contact$_1$ travels as part of the SIP Contacts header. The I-CSCF 3 interrogates the HSS 2 in step S-73, and the HSS 2 answers this interrogation with an identifier of the S-CSCF$_1$ 1 in step S-74. The I-CSCF 3 then forwards the register message towards the assigned S-CSCF$_1$ 1 during step 7-65.

The S-CSCF$_1$ 1 knows that Contact$_1$ must be removed from the data package, but also recognises that there is no other data tied to the IMPI$_1$/IMPU$_1$ pair subject to be stored in the HSS 2. The S-CSCF$_1$ 1 therefore generates a new data package which is labelled "S-CSCF-info" but which is empty. In step S-76 the data package is sent towards the HSS 2 with a Cx-SAR command containing the AVP "DE-REGISTRATION". When the HSS 2 receives the empty data package, the stored data package is deleted. In step S-78, the HSS 2 returns to the S-CSCF$_1$ 1 a service profile for the given subscriber together with an update on the user status (now deregistered).

Figure 8:
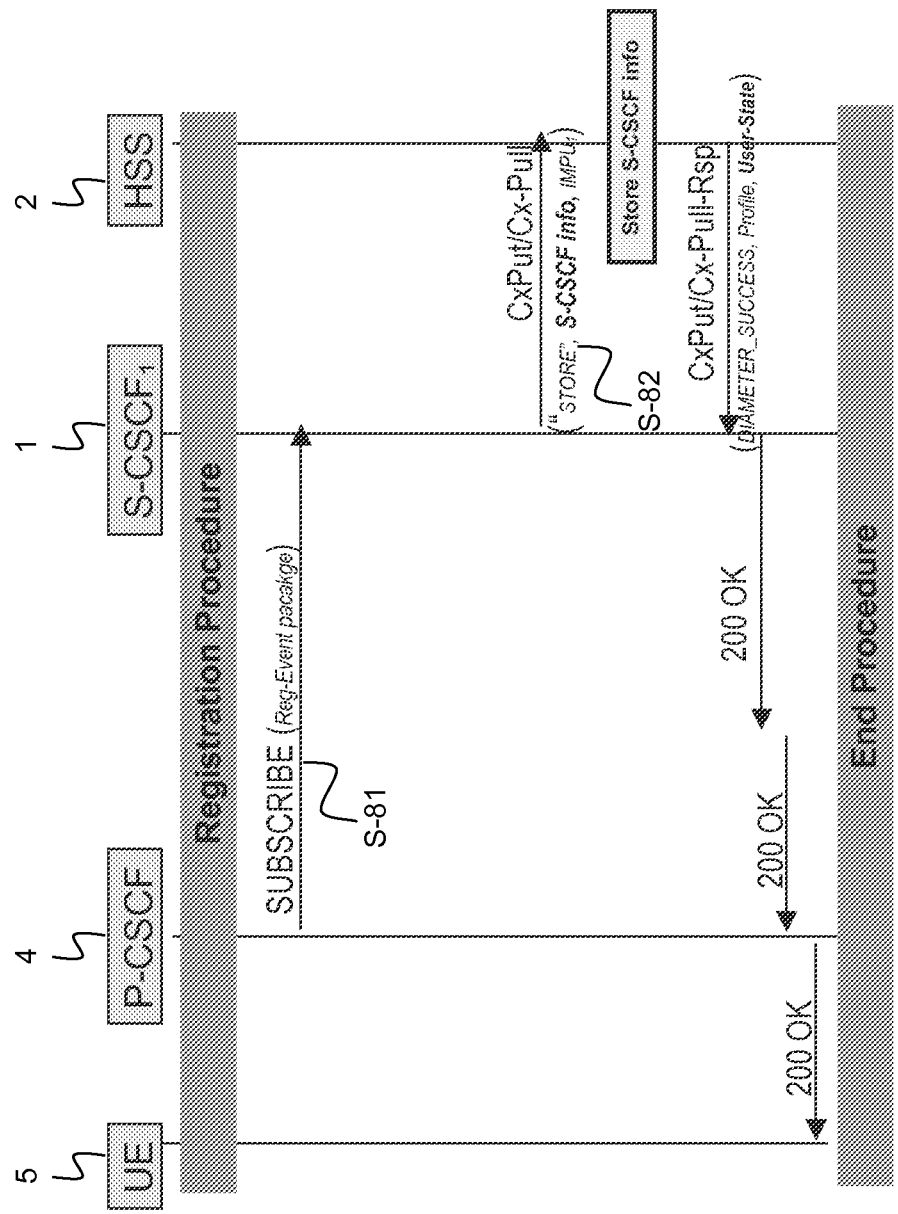
FIG. 8 is a sequence diagram illustrating the deletion of a data package which is not triggered by a deregistration process.

The deletion of a data package need not be triggered by a de-registration process. FIG. 8 illustrates a sequence of actions involved in such a deletion. Suppose the P-CSCF 4 wishes to unsubscribe from the registration event package.

In step S-81, the UE 5 sends a subscribe message to the S-CSCF$_1$ 1, in order to unsubscribe from the registration event package information. The S-CSCF$_1$ 1 recognises that the data package should be deleted, and in step S-82 an empty data package is sent to the HSS 2. The HSS 2 deletes the data package in response. The empty data package is sent to the HSS 2 using the a Cx-SAR command containing the AVP "STORE".

In each of the situations described above, the S-CSCF must know in advance the type of data (e.g. contact addresses, registration event package subscription) that the data package must contain. One way of achieving this is for a configuration parameter of the S-CSCF to define what data must be saved in a data package, and in what circumstances. In this way, the S-CSCF will always know what data, when being updated in the network, should trigger the sending of a Cx-SAR to the HSS. It will also know what data should be added to or deleted from the data package and what data should be kept in the data package.

It will be appreciated that concurrency problems due to two different S-CSCFs trying to modify the data at the same time will arise, since only one S-CSCF will be assigned to the IMPU/IMPI pair (as required by the 3GPP).

2. Unique Data Package Controlled by the HSS

As with the previously described approach, the second approach provides a mechanism in which all the S-CSCF information is stored in the HSS as one unique data package tied to an IMPI/IMPU pair. The HSS again provides the data package of information to the S-CSCF in a Cx message during the registration/deregistration procedures. However, this time the S-CSCF does not keep a track of what information is stored into HSS. When the S-CSCF is about to send a data package to the HSS for storage it is therefore necessary to retrieve data from HSS first. This data can be acted on it by adding or removing information if necessary, and a new data package can then be uploaded again to the HSS.

As with the previously described approach, the process may be understood as the S-CSCF storing data into HSS for an IMPI/IMPU pair that has no data previously stored. As before, when the S-CSCF has information to store, the data is packaged and sent to the HSS as part of the S-CSCF information in a Cx-SAR command. As before, it will usually happen during an initial registration process, but may occur ant any time, with no dependence on the user registration state. If it is part of a registration or de-registration procedure, the SAR command issued by the S-CSCF will contain the Server-Assignment-type (AVP) set to the value already specified by the 3GPP (i.e. "REGISTRATION", RE-REGISTRATION", "DE-REGISTRATION" . . . ). If the Cx-SAR command is not triggered by a registration process the AVP contains the value "STORE". Whenever the HSS receives a S-CSCF info AVP in a SAR command, the data package is stored for the IMPI/IMPU pair received in the SAR command.

Figure 9:
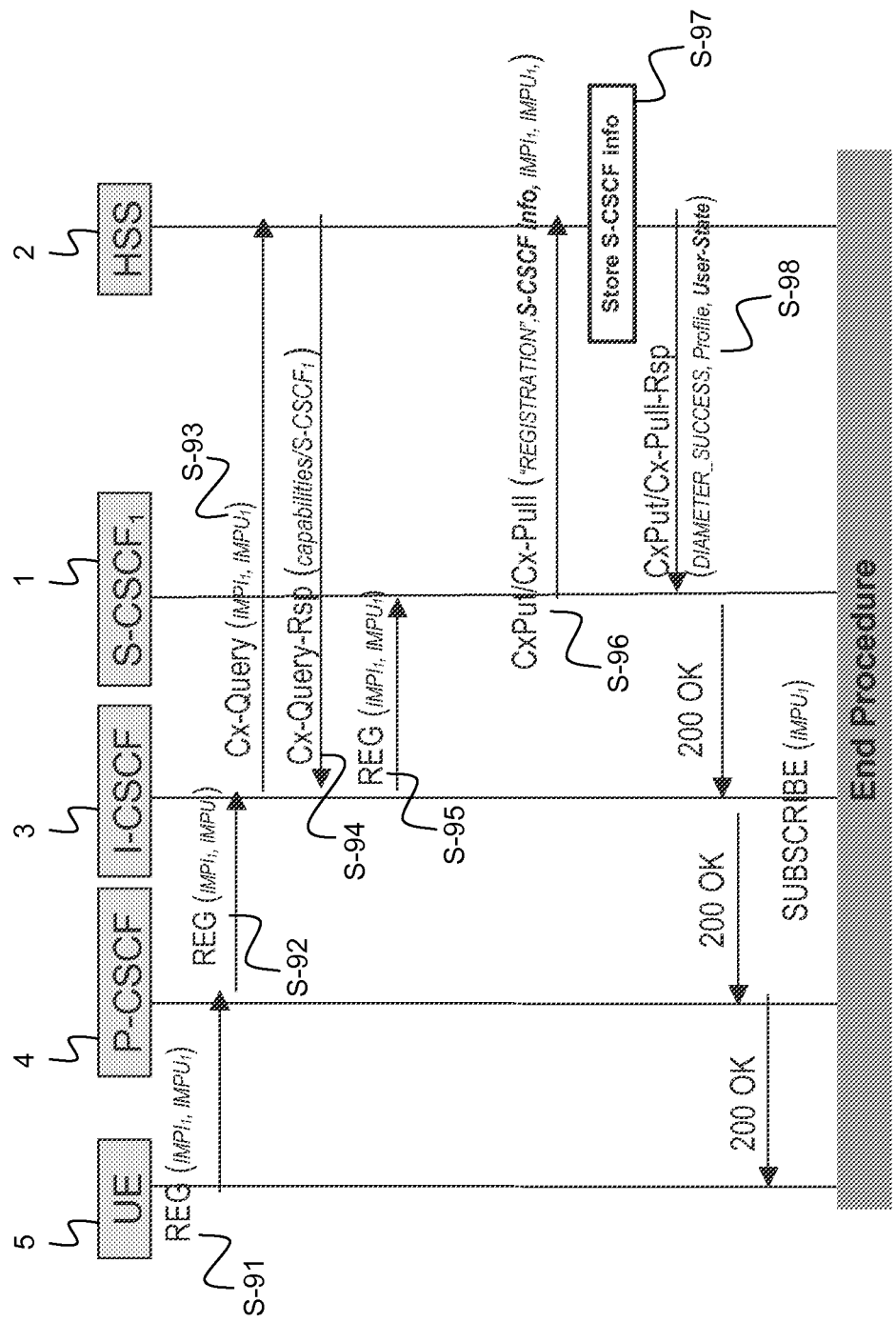
FIG. 9 is a sequence diagram illustrating a sequence of actions carried out during the registration of a subscriber in the IMS when a unique data package is controlled by the HSS.

FIG. 9 illustrates a sequence of actions carried out during the registration of a subscriber 5 in the IMS. Suppose the subscriber 5 wishes to register the address "Contact$_1$" for the private/public identity pair IMPI$_1$/IMPU$_1$. From the subscriber's point of view, this is similar to the actions undertaken in FIG. 2. In this example an assumption is made there is no other contact for the pair and no registration event package information stored for the pair. As with FIG. 2, a register message is submitted in step S-91 from the subscriber 5 towards P-CSCF 4. The register message is forwarded in step S-92 towards the I-CSCF 3 in charge of selecting a S-CSCF suitable for serving the given subscriber. Contact₁ travels as part of the SIP Contacts header. The I-CSCF 3 interrogates, during step S-93, a HSS 2 holding subscriber data for subscribers of the IMS.

The HSS 2 answers this interrogation in a step S-94 with capabilities required by a selectable S-CSCF 1 for serving the given subscriber. As with FIG. 2, the assumption is that the registration procedure is a first registration and no S-CSCF has previously been assigned. The I-CSCF 3 selects S-CSCF₁ 1 for serving the given subscriber, and forwards the register message towards the selected S-CSCF₁ 1 during step S-95.

As before, the S-CSCF₁ 1 packages the received information (which corresponds to the Contact header (Contact₁, ... )) as "S-CSCF-info" and sends this data package towards the HSS 2 during step S-96 with a Cx-SAR command containing the AVP "REGISTRATION". The data package is received at the HSS 2, which checks to see if data is already stored for the IMPI₁/IMPU₁ pair. In this example, no data has previously been stored, so the S-CSCF-info data package is stored at the HSS 2 in step S-97. In order to confirm back to the S-CSCF₁ 1 its assignation at the HSS for serving the given subscriber, the HSS 2 uploads to the S-CSCF₁ 1 during step S-98 a service profile for the given subscriber. The return of the service profile confirms to the S-CSCF that the data has been stored successfully.

As previously discussed, in some circumstances it may be necessary to modify a data package already stored at the HSS. This process may be understood as the S-CSCF sending data to the HSS for an IMPI/IMPU pair that has data already stored. This may imply adding data to an existing data package or deleting data from an existing data package.

Figure 10:
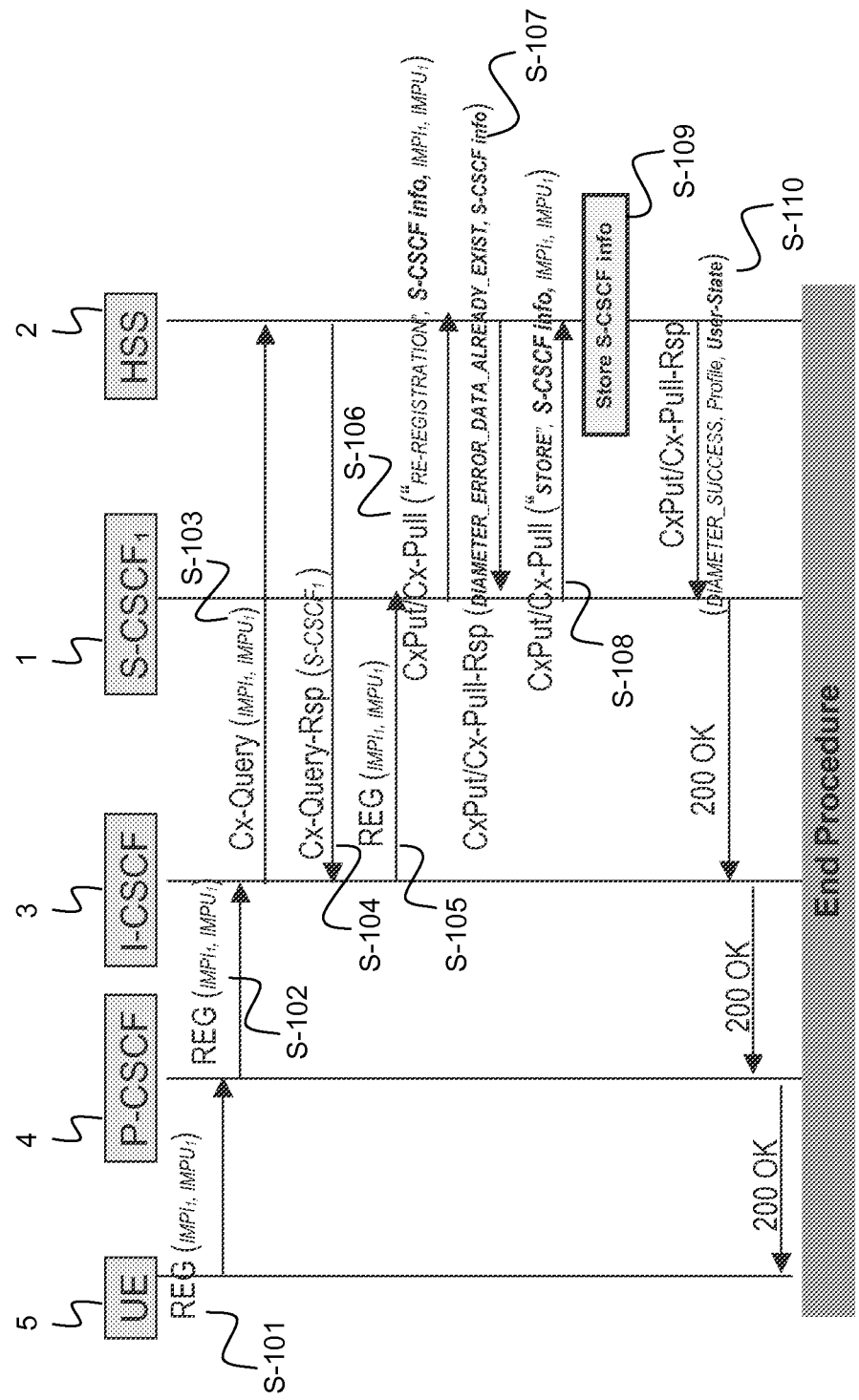
FIG. 10 is a sequence diagram illustrating the addition of data to a data package.

FIG. 10 illustrates a sequence of actions carried out in a situation requiring the addition of data to a data package. As with the example of FIG. 4, suppose that the subscriber 5 wishes to register the address "Contact₂" for the private/public identity pair IMPI₁/IMPU₁. For the purposes of this example, we assume that Contact₁ is already registered for the pair, together with the registration event package information.

The first five steps S-101 to S-105 are similar to steps S-41 to S-45 shown in FIG. 4: the subscriber 5 submits a register message in a step S-101 towards the P-CSCF 4, and this register message is forwarded in step S-102 towards the I-CSCF 3. Contact₂ travels as part of the SIP Contacts header. The I-CSCF 3 interrogates the HSS 2 in step S-103. In step S-104, the HSS 2 answers this interrogation with an identifier of the S-CSCF₁ 1 previously assigned for serving the subscriber 5. The I-CSCF 3 then forwards the register message towards the assigned S-CSCF₁ 1 during step S-105.

The S-CSCF₁ 1 does not recognise that there has been a modification of the information to be stored in the HSS 2, and packages the information to be stored (Contact₂ ... ) into a package labelled "S-CSCF-info". In step S-106 the S-CSCF 1 sends this data package towards the HSS 2 with a Cx-SAR command containing the AVP "RE-REGISTRATION". The data package is received at the HSS 2, which checks to see if data is already stored for the IMPI₁/IMPU₁ pair. This time, a data package labelled "S-CSCF-info" (containing Contact₁ etc.) is already stored at the HSS 2, so in step S-107 an error code is returned to the S-CSCF₁ 1 indicating that the data package already exists. The stored data package itself is also included with this error message.

Upon receipt of the error message, the S-CSCF₁ 1 decodes the returned data package, and adds to it the new data (Contact₂ ... ) to create a new data package, again labelled "S-CSCF info". In other words, the new data package includes the data previously stored at the HSS 2, together with the new information received by the S-CSCF₁ 1 in step 105. In this example, Contact₂ is added to the existing Contact₁ and registration event package information.

The new data package is then sent again to the HSS 2 in step S-108, but this time it is sent with a Cx-SAR command containing the AVP "STORE". When the HSS receives a SAR command with a "STORE" indication, it overwrites the data package previously stored for that IMPI₁/IMPU₁ pair. The HSS 2 saves the new data package in step S-109 and returns a success message S-110.

Figure 11:
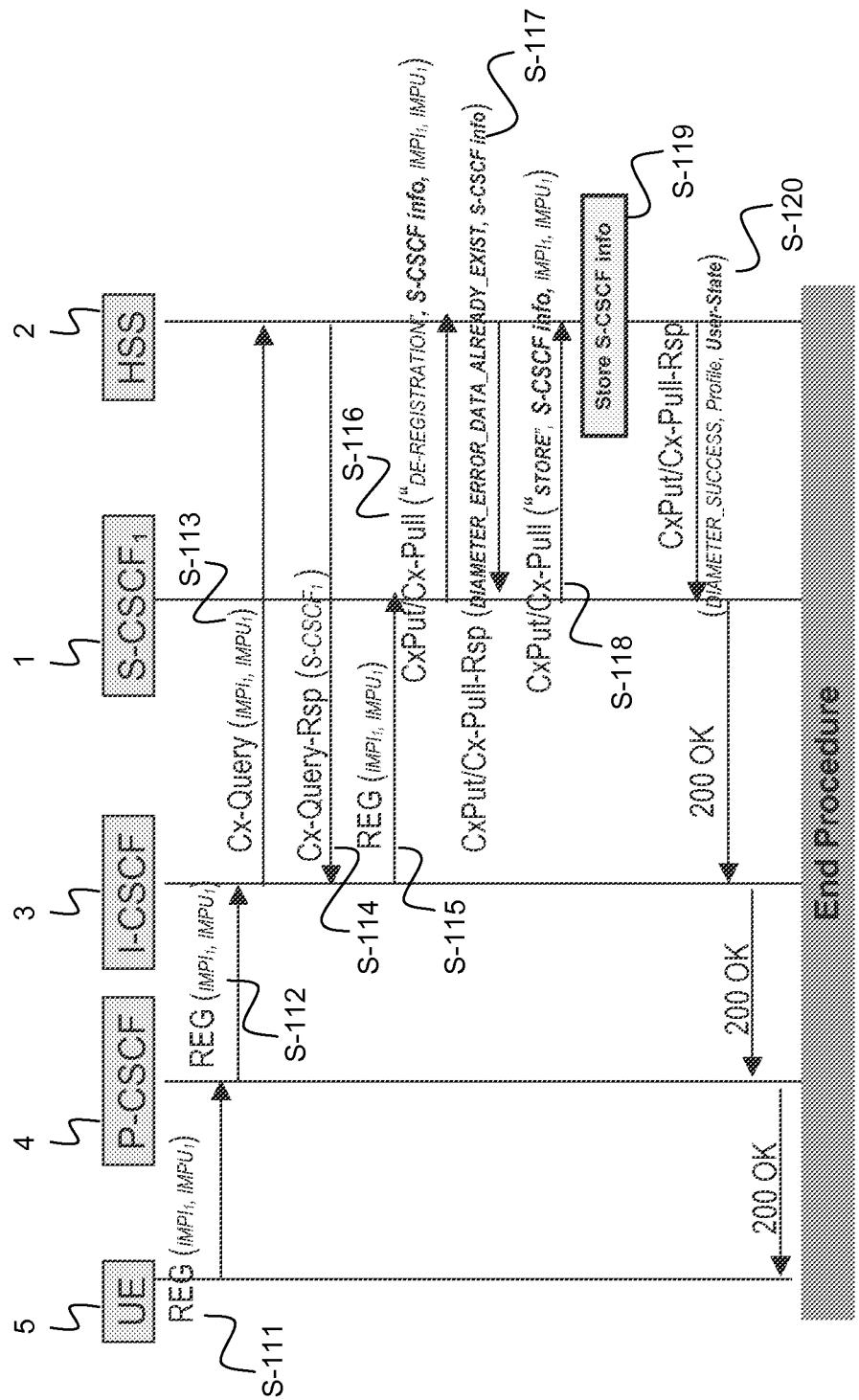
FIG. 11 is a sequence diagram illustrating the deletion of data from a data package.

A similar process may be used to delete part, or all, of a data package. FIG. 11 illustrates a sequence of actions carried out in a situation requiring the deletion of data from a data package. Suppose that the subscriber 5 wishes to deregister the address "Contact₂" for the private/public identity pair IMPI₁/IMPU₁.

The first five steps S-111 to S-115 are similar to steps S-61 to S-65 shown in FIG. 6: the subscriber 5 submits a register message in a step S-111 towards the P-CSCF 4, and this register message is forwarded in step S-112 towards the I-CSCF 3. Contact₂ travels as part of the SIP Contacts header. The I-CSCF 3 interrogates the HSS 2 in step S-113. In step S-114, the HSS 2 answers this interrogation with an identifier of the S-CSCF₁ 1 previously assigned for serving the subscriber 5. The I-CSCF 3 then forwards the register message towards the assigned S-CSCF₁ 1 during step S-115.

Since the S-CSCF₁ 1 has been instructed to deregister Contact₂, it does not create a data package to send to the HSS 2. Instead, in step S-116, a Cx-SAR command containing the AVP "DE-REGISTRATION" is sent towards the HSS 2 containing an empty field labelled "S-CSCF info). The HSS 2 identifies the fact that a data package labelled "S-CSCF-info" is stored at the HSS 2 for the IMPI₁/IMPU₁ pair, and returns an error code is returned to the S-CSCF₁ 1 in step S-117, indicating the existence of the data package already exists. The stored data package itself is also included with this error message.

Upon receipt of the error message, the S-CSCF₁ 1 decodes the returned data package, and removes from it the deregistered data (Contact₂ ... ) to create a new data package, again labelled "S-CSCF info". The new data package is then sent to the HSS 2 in step S-118 with a Cx-SAR command containing the AVP "STORE". The HSS 2 saves the new data package in step S-109 and returns a success message S-110.

It will be appreciated that, once the S-CSCF has removed data from a data package returned by the HSS, the new data package might be empty. For example, consider the situation analogous to that shown in FIG. 7, in which the subscriber 5 wishes to deregister Contact₁ for the IMPI₁/IMPU₁ pair, and there is no other remaining information for this IMPI₁/IMPU₁ pair. In this case, once the S-CSCF has removed the Contact₁ data from the data package returned by the HSS, the data package is empty and should be deleted by the HSS. In this case, the S-CSCF sends a Cx-SAR command to the HSS containing the AVP "STORE" and an empty field labelled "S-CSCF info". The HSS then deletes the whole data package.

If the S-CSCF knows initially that the whole data package should be deleted (e.g. if a whole IMPI is being deregistered), then it simply sends a Cx-SAR command to the HSS containing the AVP "STORE" and an empty field labelled "S-CSCF info". The HSS then deletes the whole data package.

Both of the approaches described above have the advantage that the HSS does not need to know the nature of the data being stored. The HSS simply stores the whole data package received from the S-CSCF. The second approach (just described) requires two SAR commands towards the HSS when data packages are to be amended, rather than simply created or deleted.

3. Separate Data Packages

The second approach provides a mechanism in which the S-CSCF information is stored in the HSS as a number of labelled (i.e. separately addressable) data packages tied to an IMPI/IMPU pair. The HSS provides data packages to the S-CSCF in Cx messages. The S-CSCF addresses, manages and manipulates the stored information in each separate data packages by different labels.

A suitable format for the information is:

```
<S-CSCF-info>
    <type of data= id>
    <packed data package=data to be stored>
``` where "type of data" indicates the data to be stored or deleted, for example "Contact Info" or "Reg-Event_Package_Info". Reference Id is an integer pointing addressing data within the data package.

Figure 12:
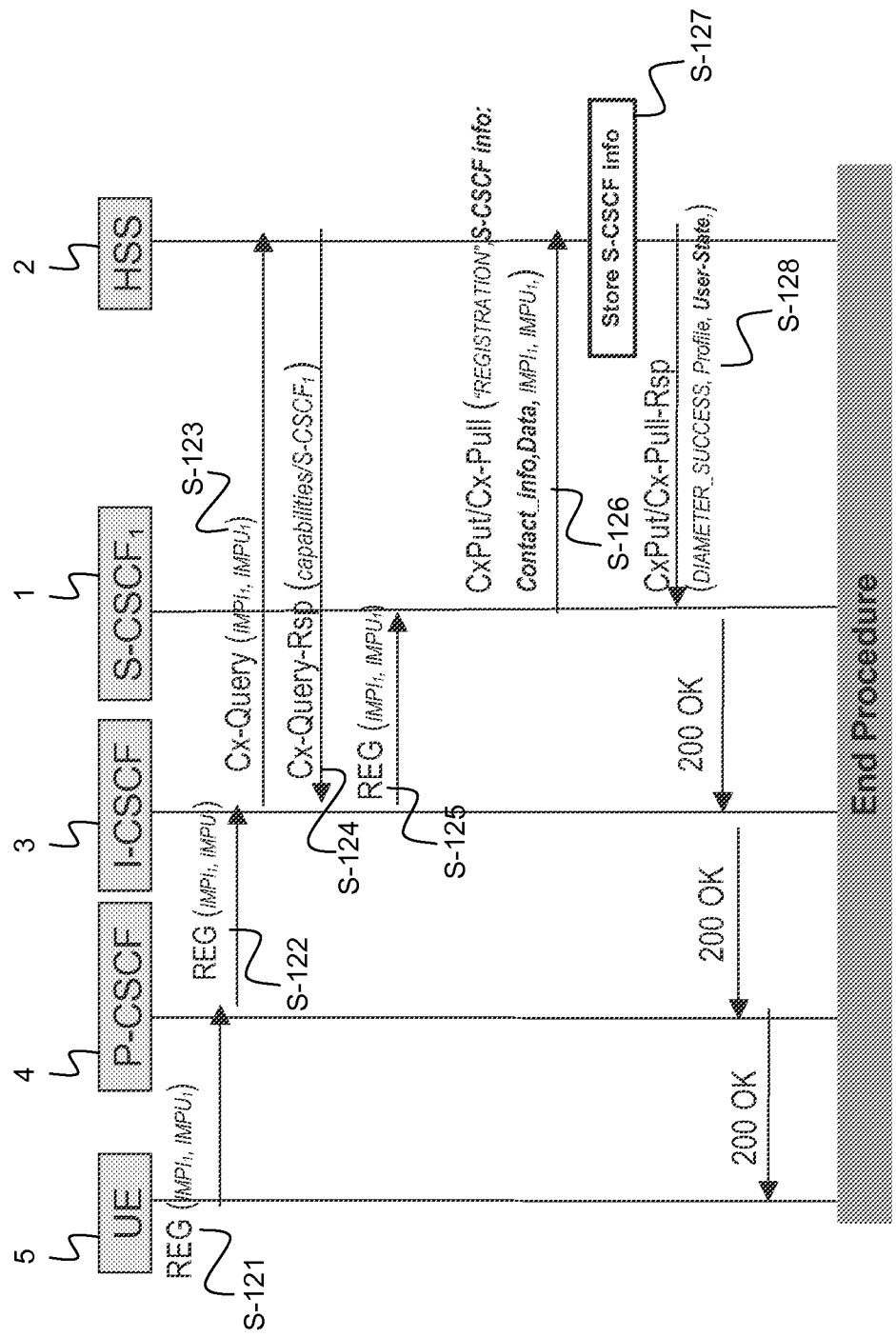
FIG. 12 is a sequence diagram illustrating a sequence of actions carried out during the registration of a subscriber in the IMS when separate data packages are generated by the S-CSCF.

Consider the situation when a subscriber first registers to the IMS. In this situation it will be necessary to create a data package for the first time. FIG. 12 illustrates a sequence of actions carried out during the registration of a subscriber 5 in the IMS. Suppose the subscriber 5 wishes to register the address "Contact$_1$" for the private/public identity pair IMPI$_1$/IMPU$_1$. From the subscriber's point of view, this is similar to the actions undertaken in FIGS. 2 and 9. In this example an assumption is made there is no other contact for the pair and no registration event package information stored for the pair. A register message is submitted in step S-121 from the subscriber 5 towards P-CSCF 4. The register message is forwarded in step S-122 towards the I-CSCF 3 in charge of selecting a S-CSCF suitable for serving the given subscriber. Contact$_1$ travels as part of the SIP Contacts header. The I-CSCF 3 interrogates, during step S-123, a HSS 2 holding subscriber data for subscribers of the IMS.

The HSS 2 answers this interrogation in a step S-124 with capabilities required by a selectable S-CSCF 1 for serving the given subscriber. As previously, the assumption is that the registration procedure is a first registration and no S-CSCF has previously been assigned. The I-CSCF 3 selects S-CSCF$_1$ 1 for serving the given subscriber, and forwards the register message towards the selected S-CSCF$_1$ 1 during step S-125. The data sent towards the HSS is labelled in a Cx-SAR command with an AVP "REGISTRATION" (as before) together with "S-CSCF info", where "S-CSCF-info" further contains <type of data: Contact_info> the packed data package.

No other data is previously stored at the HSS 2 for the IMPI$_1$/IMPU$_1$ pair. The HSS 2 therefore stores the contact information tied to the IMPI$_1$/IMPU$_1$ pair, within the label "Contact_info", in step S-127. A success message is returned to the C-CSCF$_1$ 1 in step S-128.

Figure 13:
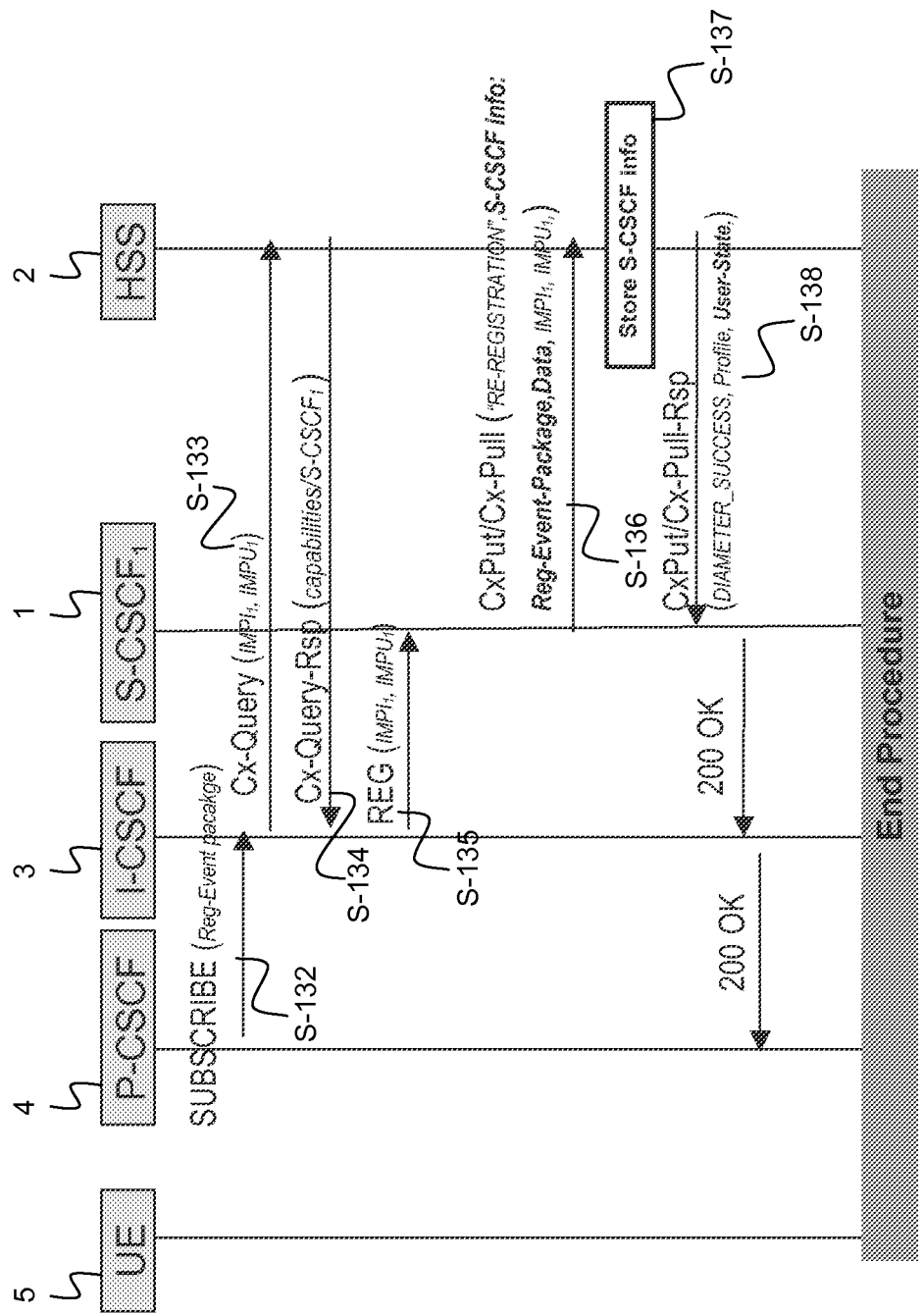
FIG. 13 is a sequence diagram illustrating the addition of data to the information stored at the HSS.

Addition to an existing data package using this approach is straightforward and can be understood with reference to FIG. 13. For example, suppose the P-CSCF 4 wishes to subscribe to the registration event package. Steps S-132-135 provide the necessary information to the S-CSCF$_1$ 1. The S-CSCF needs to add this data to the data already stored at the HSS 2, and, in step S-136, sends to the HSS 2 a Cx-SAR command with an AVP "RE-REGISTRATION" together with "S-CSCF info", where "S-CSCF-info" further contains <type of data: Reg-Event-Package> the packed data package.

The HSS 2 realises that it is a new reference for a previously registered IMPI/IMPU pair. HSS stores just the new information as a separate data package with a new label.

Figure 14:
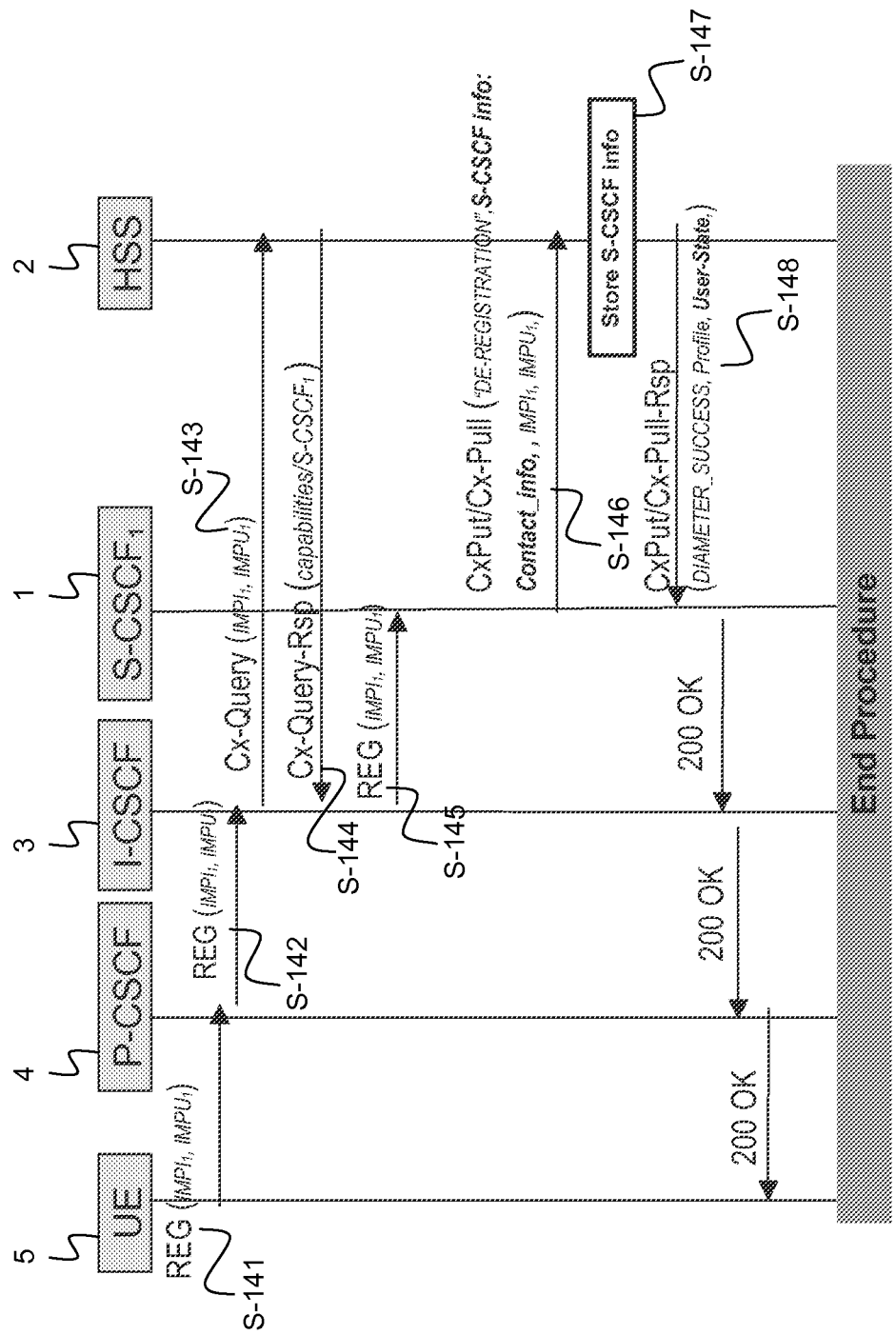
FIG. 14 is a sequence diagram illustrating the deletion of data from the information stored at the HSS

Deletion of data from stored data package information is also simple: the S-CSCF sends a SAR command to the HSS, containing the label for the data that must be deleted with an empty value. This can be understood with reference to FIG. 14, which illustrates a sequence of actions required if a subscriber 5 wishes to deregister to deregister Contact$_2$ for the private/public pair IMPI$_1$/IMPU$_1$. As in FIG. 6, the subscriber 5 submits a register message in step S-141 towards the P-CSCF 4 of the IMS, and this register message is forwarded in step S-142 towards the I-CSCF 3. Contact$_2$ travels as part of the SIP Contacts header. The I-CSCF 3 interrogates the HSS 2 in step S-143, and the HSS 2 answers this interrogation with an identifier of the S-CSCF$_1$ 1 in step S-144. The I-CSCF 3 then forwards the register message towards the assigned S-CSCF$_1$ 1 during step S-145.

The S-CSCF sends to the HSS 2 a Cx-SAR command with an AVP "DE-REGISTRATION" together with "S-CSCF info", where "S-CSCF-info" further contains <type of data: Contact_info> an empty data package.

The S-CSCF recognises that the data package for Contact$_2$ must be deleted, and in step S-147 deletes the relevant data package. A message confirming success is returned in step S-148.

If all the data packages stored by the HSS are deleted, when the HSS realizes that the last label is deleted for an IMPI/IMPU pair, the user is deregistered. It will be appreciated that during the de-registration of the contacts, for example, the registration event package information must be kept until the last contact is deleted and/or deregistered.

This third approach is simple for both the contact address and the registration event package information. Only one SAR command is required to store the information, and the S-CSCF does not need to decode any information received in the SAR command. However, standardised data package labels will be required.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated that various modifications may be made to the above-described embodiments without departing from the scope of the present invention as defined by the appended claims. In particular, it will be appreciated that, although described in relation to a Universal Mobile Telecommunications System having an IP Multimedia Subsystem, the present invention is also applicable to other types of network.

The invention claimed is:

1. A method for use by a Serving Call/Session Control Function (S-CSCF) of an IP Multimedia Subsystem (IMS), comprising the steps of:
   receiving a Session Initiation Protocol (SIP) message containing information relating to a private user identity/public user identity (IMPI/IMPU) pair;
   identifying the type of information contained in the SIP message;

identifying whether or not a previous data package relating to the IMPI/IMPU pair has previously been sent to a Home Subscriber Server (HSS) for storage;

creating a new data package containing the information to be sent to and stored by the HSS;

sending to the HSS a Server-Assignment-Request (SAR) command containing an Attribute Value Pair (AVP) including an instruction to the HSS and the new data package;

wherein, if a previous data package for the IMPI/IMPU pair has been sent to the HSS for storage, then the new data package combines the information relating to the IMPI/IMPU pair received in the SIP message with the information contained in the previous data package.

2. The method of claim 1, wherein, if the SIP message is a registration request, and no previous data package for the IMPI/IMPU pair has been sent to the HSS for storage, then the AVP in the SAR command contains the instruction "REGISTRATION".

3. The method of claim 1, wherein:
the SIP message is a registration request for an additional address to be associated with for the IMPI/IMPU pair; and,
the AVP in the SAR command contains the instruction "RE-REGISTRATION".

4. The method of claim 1, wherein:
the SIP message is not associated with registration; and
the AVP in the SAR command contains the instruction "STORE".

5. The method of claim 4, wherein the SIP message contains a subscription request to the registration event package for the IMPI/IMPU pair.

6. The method of claim 1, wherein data is deleted from the previous data package to create the new data package.

7. The method of claim 6, wherein:
the SIP message is a deregistration request; and,
the AVP in the SAR command contains the instruction "DE-REGISTRATION".

8. The method of claim 6, wherein:
the SIP message is not associated with deregistration; and
the AVP in the SAR command contains the instruction "STORE".

9. The method of claim 8, wherein the SIP message contains a subscription cancellation request to a registration event package for the IMPI/IMPU pair.

10. The method of claim 6, wherein, when the data is deleted from the previous data package, the new data package is empty, the method further comprising sending the SAR command to the HSS, the AVP in the SAR command containing the instruction "DE-REGISTRATION" and the empty data package so as to instruct the HSS to delete the previous data package.

11. A method for use in an IP Multimedia Subsystem (IMS), comprising the steps of:
at a Serving Call/Session Control Function (S-CSCF), receiving a Session Initiation Protocol (SIP) message containing information relating to a private user identity/public user identity (IMPI/IMPU) pair;
at the S-CSCF, identifying the type of information contained in the SIP message;
at the S-CSCF, creating a new data package, containing the information, to be sent to and stored by a Home Subscriber Server (HSS);
sending from the S-CSCF to the HSS a first Server-Assignment-Request (SAR) command containing an Attribute Value Pair (AVP) including an instruction to the HSS and the new data package;

at the HSS, identifying whether or not a previous data package relating to the IMPI/IMPU pair is currently stored;
if a previous data package relating to the IMPI/IMPU pair is not currently stored at the HSS, storing the new data package at the HSS;
if a previous data package associated with the IMPI/IMPU pair is currently stored at the HSS, returning an error message from the HSS to the S-CSCF, the error message including the previously stored data package;
at the S-CSCF, in response to the error message, creating a further data package which combines the information relating to the IMPI/IMPU pair received in the SIP message with the information contained in the previous data package;
sending from the S-CSCF to the HSS a second SAR command containing an AVP including the instruction "STORE" and the further data package; and,
storing the further data package at the HSS.

12. A method for use by a Serving Call/Session Control Function (S-CSCF) of an IP Multimedia Subsystem (IMS), comprising:
receiving a Session Initiation Protocol (SIP) message containing information relating to a private user identity/public user identity (IMPI/IMPU) pair;
identifying the type of information contained in the SIP message;
creating a data package to be sent to and stored by a Home Subscriber Server (HSS), the data package including the information contained in the SIP message and a data label indicating the type of data so as to provide information to the HSS to enable it to store S-CSCF information in labelled, separately addressable, data packages tied to the IMPI/IMPU pair; and,
sending to the HSS a Server-Assignment-Request (SAR) command containing an Attribute Value Pair (AVP) including an instruction to the HSS and the data package.

13. The method of claim 12, wherein:
the SIP message is a registration request;
no previous data package for the IMPI/IMPU pair has been sent to the HSS for storage;
the data label indicates that the data package contains contact address information; and,
the AVP in the SAR command contains the instruction "REGISTRATION".

14. The method of claim 12, wherein:
the SIP message is a registration request for an additional address to be associated with for the IMPI/IMPU pair;
the data label indicates that the data package contains contact address information; and,
the AVP in the SAR command contains the instruction "RE-REGISTRATION".

15. The method of claim 12, wherein:
the SIP message is not associated with registration; and,
the AVP in the SAR command contains the instruction "RE-REGISTRATION".

16. The method of claim 15, wherein:
the SIP message contains a subscription request to a registration event package for the IMPI/IMPU pair; and,
the data label includes an indication that the data package contains information relating to the registration event package.

17. The method of claim 12, wherein:
a previously stored data package should be deleted from the HSS;

the AVP in the SAR command contains the instruction "DE-REGISTRATION"; and, the data package contains only the data label and an empty data field, to indicate to the HSS that a previously stored data package identified by the same data label should be deleted.

18. The method of claim 17, wherein:

the SIP message is a deregistration request; and, the data label indicates that the data package contains contact address information.

19. A Serving Call/Session Control Function (S-CSCF) assignable for serving a subscriber registered in an IP Multimedia Subsystem (IMS), the S-CSCF comprising:

a receiver for receiving a Session Initiation Protocol (SIP) message containing information relating to a private user identity/public user identity (IMPI/IMPU) pair;

a processor for identifying the type of information contained in the SIP message and creating a new data package, containing the information, to be sent to and stored by the HSS; and, a sender for sending to a Home Subscriber Server (HSS) a Server-Assignment-Request (SAR) command containing an Attribute Value Pair (AVP) including an instruction to the HSS and the new data package;

wherein, if a previous data package for the IMPI/IMPU pair has been sent to the HSS for storage, then the processor is configured to combine the information relating to the IMPI/IMPU pair received in the SIP message with the information contained in the previous data package.

20. The S-CSCF of claim 19, wherein the processor is configured to identify whether or not the previous data package relating to the IMPI/IMPU pair has previously been sent to the HSS for storage.

21. The S-CSCF of claim 19, wherein the processor and sender are configured to send the SAR command without initially checking whether a previous data package for the IMPI/IMPU pair was sent to the HSS for storage, and wherein the receiver, processor and sender are configured so that, if a previous data package associated with the IMPI/IMPU pair is currently stored at the HSS:

the receiver receives an error message from the HSS, the error message including the previously stored data package;

the processor is creates a further data package which combines the information relating to the IMPI/IMPU pair received in the SIP message with the information contained in the previous data package; and, the sender sends to the HSS a second SAR command containing an AVP including the instruction "STORE" and the further data package.

22. The S-CSCF of claim 19, wherein the processor is configured to include in the new data package a data label indicating the type of data.

23. A Home Subscriber Server (HSS) holding subscriber data for subscribers of an IP Multimedia Subsystem (IMS), the HSS comprising:

a receiver for receiving from a Serving Call/Session Control Function (S-CSCF) a Server-Assignment-Request (SAR) command containing an Attribute Value Pair (AVP) including an instruction to the HSS and a data package containing information taken from a SIP request relating to an IMPI/IMPU pair;

storage means for storing the data package;

a processor for identifying whether a previous data package relating to the IMPI/IMPU pair is currently stored in the storage means; and a sender configured to send an error message, including the previous data package relating to the IMPI/IMPU pair, to the S-CSCF if the previous data package is currently stored in the storage means, the storage means being configured to retain the previous data package;

wherein, if the error message is sent, the receiver is configured to receive from the S-CSCF a second SAR command containing an AVP including the instruction "STORE" and a further data package, the further data package combining the information taken from the SIP request relating to the IMPI/IMPU pair with the information contained in the previous data package; and, wherein the storage means is configured to store the further data package.

24. The HSS of claim 23, wherein the sender is configured to send the error message to the S-CSCF only if the SAR command contains the instruction, "RE-REGISTRATION" or "DE-REGISTRATION".

25. The HSS claim 23, wherein the storage means is configured to store the data package and overwrite any previously stored data packages relating to the IMPI/IMPU pair if the SAR command contains the instruction "STORE".

* * * * *

UNITED STATES PATENT AND TRADEMARK OFFICE
CERTIFICATE OF CORRECTION

PATENT NO. : 8,510,457 B2
APPLICATION NO. : 12/745655
DATED : August 13, 2013
INVENTOR(S) : Belinchon Vergara et al.

It is certified that error appears in the above-identified patent and that said Letters Patent is hereby corrected as shown below:

In the Drawings

In Fig. 3, Sheet 3 of 14, delete "(DIAMETER_SUCCESS, ,)" and insert -- (DIAMETER_SUCCESS, Profile,) --, therefor.

In the Specification

In Column 5, Line 2, delete "C-CSCF" and insert -- S-CSCF --, therefor.

In Column 7, Line 16, delete "RE-REGISTRATION"," and insert -- "RE-REGISTRATION", --, therefor.

In Column 8, Line 15, delete "S-SCSF$_1$" and insert -- S-CSCF$_1$ --, therefor.

In Column 9, Line 8, delete "using the" and insert -- using --, therefor.

In Column 10, Line 9, delete "using the" and insert -- using --, therefor.

In Column 10, Line 46, delete "ant" and insert -- at --, therefor.

In Column 10, Lines 50-51, delete "RE-REGISTRATION"," and insert -- "RE-REGISTRATION", --, therefor.

In Column 13, Line 58, delete "C-CSCF$_1$" and insert -- S-CSCF$_1$ --, therefor.

In the Claims

In Column 18, Line 41, in Claim 25, delete "HSS claim 23," and insert -- HSS of claim 23, --, therefor.

Signed and Sealed this
First Day of April, 2014

Michelle K. Lee
*Deputy Director of the United States Patent and Trademark Office*